(12) United States Patent
Kukimoto et al.

(10) Patent No.: US 10,720,054 B2
(45) Date of Patent: Jul. 21, 2020

(54) DISPLAY PROCESSING APPARATUS AND DISPLAY PROCESSING METHOD

(71) Applicant: DENSO TEN Limited, Kobe-shi, Hyogo (JP)

(72) Inventors: Osamu Kukimoto, Kobe (JP); Chiharu Yamamoto, Kobe (JP); Masahiro Iino, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/258,965

(22) Filed: Jan. 28, 2019

(65) Prior Publication Data

US 2019/0251840 A1    Aug. 15, 2019

(30) Foreign Application Priority Data

Feb. 9, 2018    (JP) .................................. 2018-022373

(51) Int. Cl.
| | |
|---|---|
| *B60Q 1/00* | (2006.01) |
| *G08G 1/0962* | (2006.01) |
| *B60K 35/00* | (2006.01) |
| *G02B 27/01* | (2006.01) |

(52) U.S. Cl.
CPC ........... *G08G 1/0962* (2013.01); *B60K 35/00* (2013.01); *G02B 27/01* (2013.01); *B60K 2370/152* (2019.05)

(58) Field of Classification Search
CPC .................. G08G 1/0962; B60K 35/00; B60K 2370/152; G02B 27/01
See application file for complete search history.

(56) References Cited

U.S. PATENT DOCUMENTS

| | | | |
|---|---|---|---|
| 2017/0206045 A1* | 7/2017 | Matsukawa | G06F 3/14 |
| 2017/0249923 A1* | 8/2017 | Segawa | B60K 35/00 |
| 2017/0253122 A1* | 9/2017 | Jun | B60K 35/00 |
| 2018/0208060 A1* | 7/2018 | Kim | B60W 50/14 |

FOREIGN PATENT DOCUMENTS

JP    2007-083990 A    4/2007

* cited by examiner

*Primary Examiner* — Phung Nguyen
(74) *Attorney, Agent, or Firm* — Oliff PLC

(57) ABSTRACT

A display processing apparatus according to an embodiment includes an acquisition unit, a setting unit, and a change unit. The acquisition unit acquires notification information. The setting unit sets, for each of a plurality of display screens, notification information to be displayed on a corresponding display screen based on a priority of the notification information. The change unit changes, when changing notification information of one of the plurality of display screens based on a user's operation on a display screen set by the setting unit, notification information to be displayed on another of the plurality of display screens based on a change in the notification information on the one display screen.

5 Claims, 4 Drawing Sheets

DISPLAY PROCESSING APPARATUS AND DISPLAY PROCESSING METHOD

CROSS-REFERENCE TO RELATED APPLICATION

This application is based upon and claims the benefit of priority of the prior Japanese Patent Application No. 2018-022373, filed on Feb. 9, 2018, the entire contents of which are incorporated herein by reference.

FIELD

The embodiment discussed herein is directed to a display processing apparatus and a display processing method.

BACKGROUND

Conventionally, there has been known a display processing apparatus that changes, on the basis of the priority, an icon to be displayed on a screen (see, e.g., Japanese Laid-open Patent Publication No. 2007-083990).

However, in the above-mentioned display processing apparatus, there is not considered displaying, on the basis of the priority, notification information on a plurality of display screens. Thus, there presents room for improvement in providing notification information to a user.

SUMMARY

A display processing apparatus according to an embodiment includes an acquisition unit, a setting unit, and a change unit. The acquisition unit acquires notification information. The setting unit sets, for each of a plurality of display screens, notification information to be displayed on a corresponding display screen based on a priority of the notification information. The change unit changes, when changing notification information of one of the plurality of display screens based on a user's operation on a display screen set by the setting unit, notification information to be displayed on another of the plurality of display screens based on a change in the notification information on the one display screen.

DESCRIPTION OF EMBODIMENTS

Hereinafter, an embodiment of a display processing apparatus and a display processing method according to the present application will be described in detail with reference to the accompanying drawings. The present disclosure is not limited to the embodiment described in the following.

Figure 1:
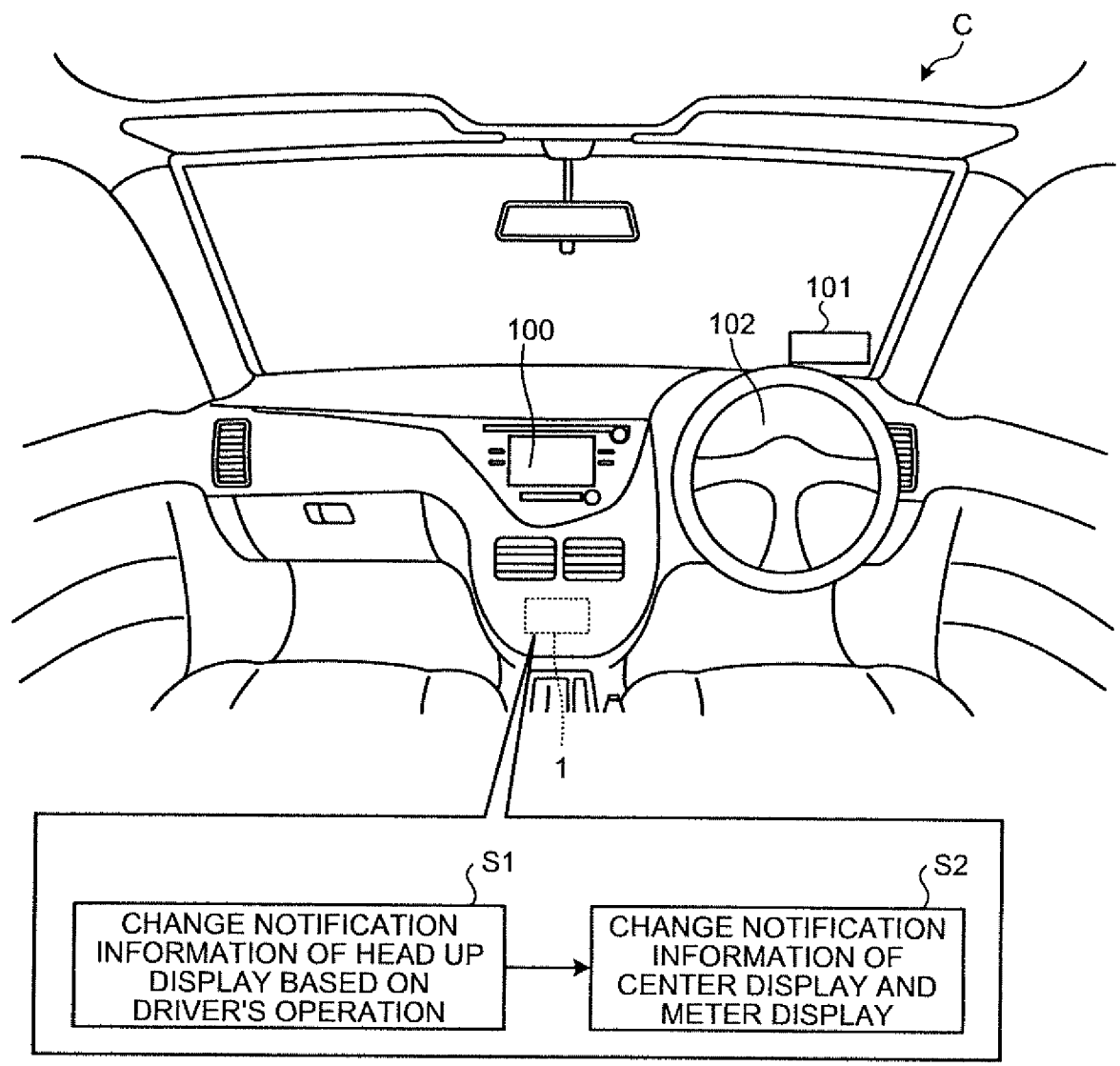
FIG. 1 is a diagram illustrating the outline of a display processing method according to an embodiment.

First, the outline of a display processing method to be executed by the display processing apparatus according to the embodiment will be explained with reference to FIG. 1. FIG. 1 is a diagram illustrating the outline of the display processing method according to the embodiment.

A display processing apparatus 1 causes a center display 100, a head up display 101, and a meter display 102, which are display screens provided in a vehicle C, to display notification information.

The center display 100 is arranged in the center of a front portion of the vehicle C. The head up display 101 is arranged near a windscreen of the vehicle C. The meter display 102 is arranged in an instrument panel including meters. The displays may include a rear display for a rear seat of the vehicle C.

The notification information is output from an on-vehicle device 30 (see FIG. 2), and includes information on a near accident, road information on a speed limit and the like, traffic jam information, and information a title of a music song and the like, for example.

The display processing apparatus 1 sets, for each of the displays 100 to 102, notification information to be displayed on a corresponding one of the displays 100 to 102 on the basis of the priority of the notification information, so as to change notification information to be displayed on the displays 100 to 102. The display processing apparatus 1 may cause the displays 100 to 102 to display respective pieces of notification information that are different from one another, or may cause the displays 100 to 102 to display the same notification information. In other words, the display processing apparatus 1 sets, in accordance with a priority of each piece of the notification information, how to display the corresponding piece of the notification information on the displays 100 to 102, so as to cause the displays 100 to 102 to display the corresponding piece of the notification information.

The priority is a value that is previously set for each piece of notification information to become a determination reference for determining a piece of notification information to be displayed on the displays 100 to 102 when there presents a plurality of output requests for notification information. For example, "10" is set, as a priority, for notification information on a near accident, and "30" is set, as a priority, for notification information on road information. Moreover, "50" is set, as a priority, for notification information on traffic jam information, and "100" is set, as a priority, for notification information on a title of a music song.

A priority is higher as a numeric value of the priority is smaller, and the notification information is preferentially displayed on the displays 100 to 102. For example, when there present, as output requests for the head up display 101, output requests for notification information on a near accident and notification information on a title of a music song, the notification information on the near accident having a smaller numeric value of the priority is displayed on the head up display 101.

When changing on the basis of an operation of a user (for example, driver), from a state where notification information is reported to each of the displays 100 to 102 on the basis of the priority, notification information displayed on the head up display 101 (Step S1), the display processing apparatus 1 changes, on the basis of a change of the notification information on the head up display 101, notification information to be displayed on the center display 100 and notification information to be displayed on the meter display 102 (Step S2). Hereinafter, a driver is exemplified as a user; however, not limited thereto.

In other words, when an operation (displaying switch operation) of a driver is performed on one display from a state where each of the displays 100 to 102 is informed of a corresponding piece of notification information on the basis of a corresponding priority, the display processing apparatus 1 changes notification information on the one display on the basis of the priority. The display processing apparatus 1 causes the one display to display notification information having the highest priority.

The display processing apparatus 1 changes, on the basis of a change in notification information to be displayed on the one display, notification information to be displayed on the other display. Note that the display processing apparatus 1 changes notification information to be displayed on the other display on the basis of the priority.

As described above, the display processing apparatus 1 sets, for each of the displays 100 to 102, notification information to be displayed in accordance with a priority of the corresponding piece of the notification information. When a driver performs a displaying switch operation on one display, the display processing apparatus 1 changes notification information on the one display into notification information having the highest priority, and adjusts notification information on the other displays in response to the changed state.

Thus, by employing the display processing apparatus 1, it is possible to improve provision of notification information to a driver.

Figure 2:
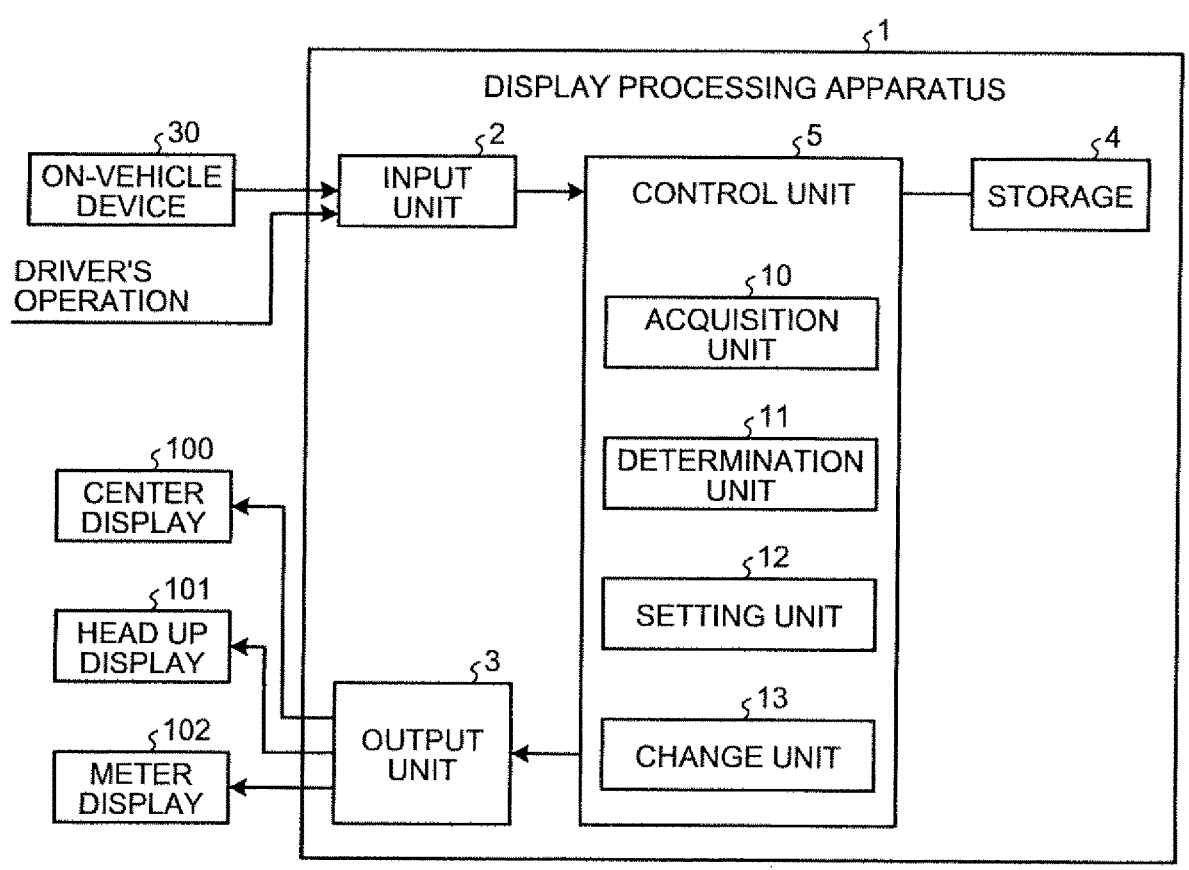
FIG. 2 is a block diagram illustrating the outline of a display processing apparatus according to the embodiment.

Next, the display processing apparatus 1 according to the present embodiment will be explained with reference to FIG. 2. FIG. 2 is a block diagram illustrating the outline of the display processing apparatus 1 according to the embodiment.

The display processing apparatus 1 includes an input unit 2, an output unit 3, a storage 4, and a control unit 5.

Notification information is input to the input unit 2 from any of the on-vehicle devices 30. The number of the on-vehicle devices 30 is two or more. The on-vehicle devices 30 include a car navigation device, an audio device, a driver assistance device, and a traffic-information receiving device, for example. A signal associated with an operation performed by a driver is input to the input unit 2. The operation performed by the driver is a displaying switch operation for switching notification information displayed on the displays 100 to 102, and includes an operation for changing presently-displayed notification information, an operation for deleting presently-displayed notification information, an operation for causing another display to display presently-displayed notification information, etc. The driver's operation is performed by using a sound or an operation for a button, for example.

The driver assistance apparatus transmits, to the input unit 2, notification information on a near accident. The traffic-information receiving device receives road information on a speed limit, traffic jam information, or the like, so as to transmit the received information to the input unit 2.

The output unit 3 outputs, to the head up display 101, the center display 100, and the meter display 102, respective signals associated with pieces of notification information to be displayed on the head up display 101, the center display 100, and the meter display 102. The displays 100 to 102 display notification information on the basis of the respective signals associated with the notification information.

The storage 4 is a storage device such as a Random Access Memory (RAM) and a hard disk. The storage 4 stores therein information on various programs and the like.

The control unit 5 includes a microcomputer including, for example, a Central Processing Unit (CPU), a Read Only Memory (ROM), an RAM, an input/output port, etc.; and various circuits. A part or a whole of the control unit 5 may be constituted of hardware such as an Application Specific Integrated Circuit (ASIC) and a Field Programmable Gate Array (FPGA).

The control unit 5 includes a plurality of processing units that functions by executing a program (not illustrated) stored in the ROM by using the RAM as a work region. Specifically, the control unit 5 includes an acquisition unit 10, a determination unit 11, a setting unit 12, and a change unit 13. The control unit 5 may be constituted of a plurality of control units, each of the processing units may be constituted of a plurality of processing units, and any of the processing units may be integrated with each other.

The acquisition unit 10 acquires, via the input unit 2, pieces of notification information from the on-vehicle devices 30. The acquisition unit 10 acquires, via the input unit 2, a driver's operation.

When notification information is acquired, the determination unit 11 determines a priority of the notification information. When there presents a plurality of pieces of notification information, the determination unit 11 compares priorities of the pieces of the notification information with one another, so as to determine which of the priorities is high. The determination unit 11 executes, for each of the displays 100 to 102, determination based on the priority.

For example, when notification information is newly acquired, the determination unit 11 compares a priority of presently-displayed notification information with a priority of the newly-acquired notification information, so as to determine which priority is higher. When pieces of notification information are simultaneously acquired from the plurality of on-vehicle devices 30, the determination unit 11 compares priorities of the pieces of the notification information with each other, so as to determine which priority is higher.

The determination unit 11 determines whether or not notification information displayed on the displays 100 to 102 are changed by a user on the basis of a driver's operation. In other words, the determination unit 11 determines whether or not a displaying change of notification information is executed on the basis of the driver's operation. The determination unit 11 determines, from amongst the displays 100 to 102, a display whose notification information is to be changed by the driver's operation. For example, when a driver changes a song title in an audio device, the determination unit 11 determines to change, by a driver's operation, notification information displayed on the center display 100.

The setting unit 12 sets notification information to be displayed on the displays 100 to 102 on the basis of a priority of the notification information. The setting unit 12 sets, for each of the displays 100 to 102, notification information to be displayed thereon.

When new notification information is acquired and a priority of the new notification information is higher than a priority of presently-displayed notification information, the setting unit 12 sets, to the new notification information, notification information to be displayed on the displays 100 to 102.

When new notification information is acquired and a priority of the new notification information is lower than a priority of presently-displayed notification information, the setting unit 12 sets, to the presently-displayed notification information, notification information to be displayed on the displays 100 to 102.

When new notification information is acquired and a priority of the new notification information is lower than a priority of presently-displayed notification information, the setting unit 12 sets, to the new notification information, notification information to be displayed just after the presently-displayed notification information. When new notification information is acquired and a priority of the new notification information is lower than a priority of presently-displayed notification information, the setting unit 12 may cancel the new notification information.

As described above, when new notification information is acquired, the setting unit 12 decides, on the basis of a priority of the notification information, which piece of notification information is to be preferentially displayed, and sets notification information to be displayed on the displays 100 to 102. In other words, when pieces of notification information are acquired, the setting unit 12 executes, on the basis of priorities of the pieces of the notification information, an adjustment between the pieces of the notification information to be displayed on the displays 100 to 102, and sets notification information to be displayed on the displays 100 to 102 to notification information having the highest priority.

The setting unit 12 sets, on the basis of a driver's operation, notification information to be displayed on the displays 100 to 102. When there presents a driver's operation, the setting unit 12 sets notification information that is to be displayed on one of the displays 100 to 102, on the basis of the driver's operation. Moreover, the setting unit 12 sets, on the basis of the notification information to be displayed on the one display, notification information to be displayed on another display. When setting notification information to be displayed on the displays 100 to 102 on the basis of a driver's operation, the setting unit 12 also sets (adjusts) notification information on the basis of the priority.

The change unit 13 changes, on the basis of the set notification information, notification information of the displays 100 to 102. In other words, the change unit 13 changes, on the basis of an adjustment result of the setting unit 12 and the driver's operation, notification information of the displays 100 to 102. When changing notification information to be displayed on one display on the basis of a driver's operation, the change unit 13 changes, on the basis of the change of notification information of the one display, notification information to be displayed on another display.

Figure 3A:
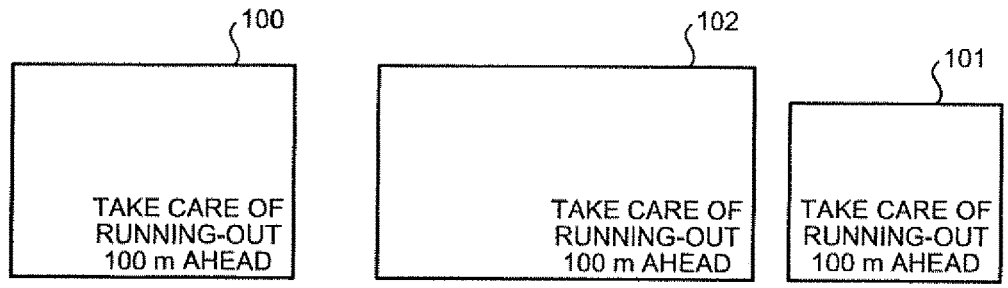
FIG. 3A is a diagram illustrating displaying examples (before change) of displays.

For example, as illustrated in FIG. 3A, "take care of running-out 100 m ahead" is displayed, as notification information on a near accident, on the center display 100, the head up display 101, and the meter display 102. FIG. 3A is a diagram illustrating displaying examples (before change) of the displays 100 to 102. In this state, when an operation for deleting the notification information on the near accident is performed on the center display 100 by a driver's operation, notification information to be displayed on the center display 100 is set on the basis of the priority. Therefore, the next notification information is displayed on the center display 100 on the basis of the priority. For example, the next notification information of the center display 100 is notification information on traffic jam information, namely, "traffic jam 5 km ahead".

Figure 3B:
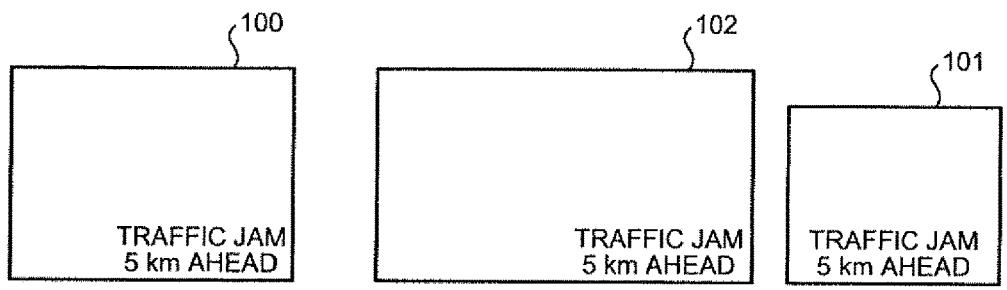
FIG. 3B is a diagram illustrating displaying examples (after change) of the displays.

In this case, as illustrated in FIG. 3B, the display processing apparatus 1 changes, on the basis of the driver's operation, notification information displayed on the center display 100 from "take care of running-out 100 m ahead" into "traffic jam 5 km ahead". The display processing apparatus 1 sets, in accordance with the change in the notification information displayed on the center display 100, notification information to be displayed on the head up display 101 and the meter display 102, which are the other displays, on the basis of the priority. For example, as illustrated in FIG. 3B, the display processing apparatus 1 changes "take care of running-out 100 m ahead" into "traffic jam 5 km ahead". FIG. 3B is a diagram illustrating displaying examples (after change) of the displays 100 to 102.

A piece of notification information that is different for each of the displays 100 to 102 may be displayed on a corresponding one of the center display 100, the head up display 101, and the meter display 102 on the basis of priorities for the displays 100 to 102. Furthermore, a user's operation may be performed on the head up display 101 and/or the meter display 102.

Figure 4:
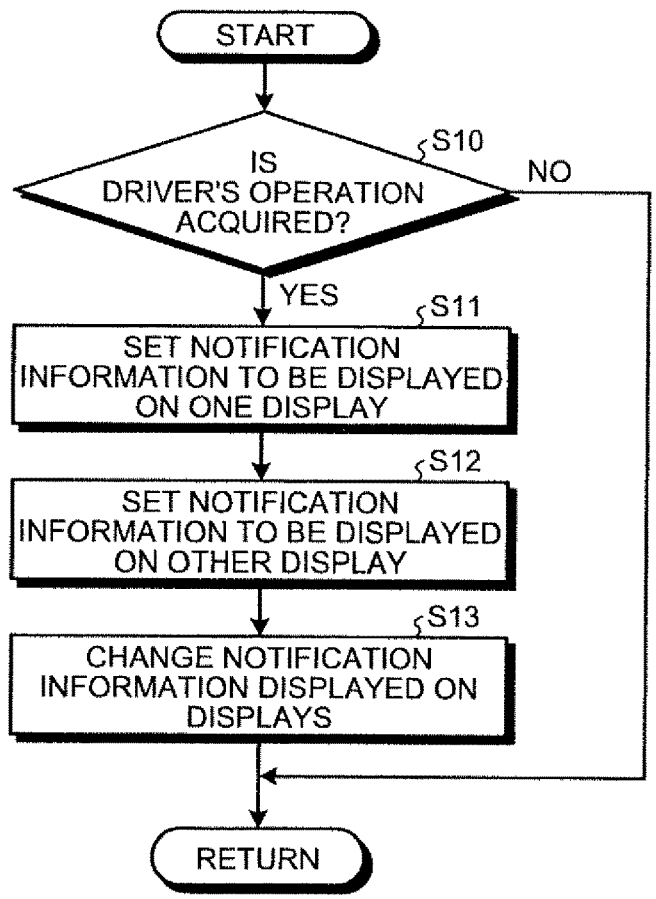
FIG. 4 is a flowchart illustrating a display changing control according to the embodiment.

Next, a display changing control caused by a driver's operation according to the embodiment will be explained with reference to FIG. 4. FIG. 4 is a flowchart illustrating the display changing control according to the embodiment.

The display processing apparatus 1 determines whether or not the display processing apparatus 1 acquires a driver's operation (Step S10). When not acquiring any driver's operation (Step S10: No), the display processing apparatus 1 ends the present processing.

When acquiring a driver's operation (Step S10: Yes), the display processing apparatus 1 sets notification information to be displayed on one display on the basis of the driver's operation (Step S11).

The display processing apparatus 1 sets, on the basis of the notification information to be displayed on the one display, notification information to be displayed on the other display (Step S12).

The display processing apparatus 1 changes notification information displayed on the displays 100 to 102 (Step S13).

In the aforementioned, the head up display 101, the meter display 102, and the center display 100 are exemplified as displays; however, the displays may be include a display obtained by dividing an integrated-type display into a plurality of regions to display respective screens on the regions.

When pieces of notification information are set for the displays 100 to 102 on the basis of priorities and notification information displayed on one of the displays is going to be changed on the basis of a driver's operation, the display processing apparatus 1 changes, on the basis of the change in the notification information displayed on the one display, notification information to be displayed on the other display.

Thus, the display processing apparatus 1 is capable of causing the other display to display the changed-into notification information so as to cause a driver to easily recognize the changed-into notification information, so that it is possible to improve provision of notification information to the driver.

When changing, on the basis of a driver's operation, notification information displayed on one of displays that are displaying the same notification information, the display processing apparatus 1 changes the same notification information displayed on the other display on the basis of the change in the notification information of the one display.

Thus, the display processing apparatus 1 is capable of causing a driver to more easily recognize the changed-into notification information, so that it is possible to improve provision of notification information to the driver. For example, in a state where notification information displayed on the center display 100 is changed on the basis of a driver's operation, when the change is reflected on the head up display 101 and the meter display 102, a driver is able to easily recognize the change in the notification information.

Next, a modification of the embodiment will be explained. When notification information displayed on one display is changed on the basis of a driver's operation, the display processing apparatus 1 according to the modification causes the other displays to display notification information that includes notification information to be displayed on the one display and presently-displayed notification information displayed on the other displays.

Figure 5A:
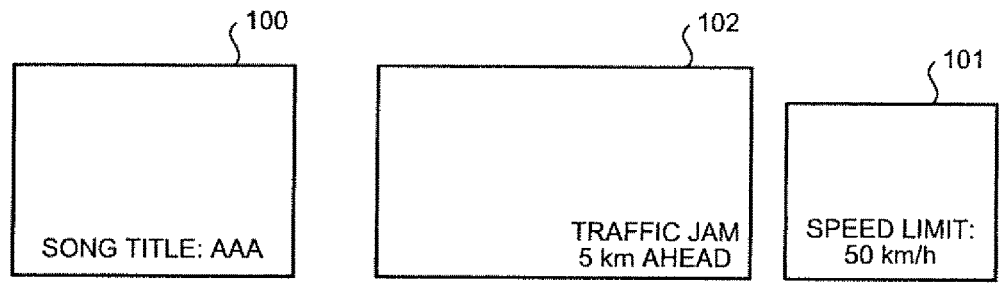
FIG. 5A is a diagram illustrating displaying examples (before change) of displays.

For example, as illustrated in FIG. 5A, "speed limit: 50 km/h" is displayed on the head up display 101 as notification information on road information. Furthermore, "traffic jam 5 km ahead" is displayed on the meter display 102 as notification information on traffic jam information. Furthermore, "song title: AAA" is displayed on the center display 100 as notification information on a title a music song. FIG. 5A is a diagram illustrating displaying examples (before change) of the displays 100 to 102. In this state, assume that a song is changed by a driver's operation, and a song title is changed from "AAA" into "BBB", for example.

Figure 5B:
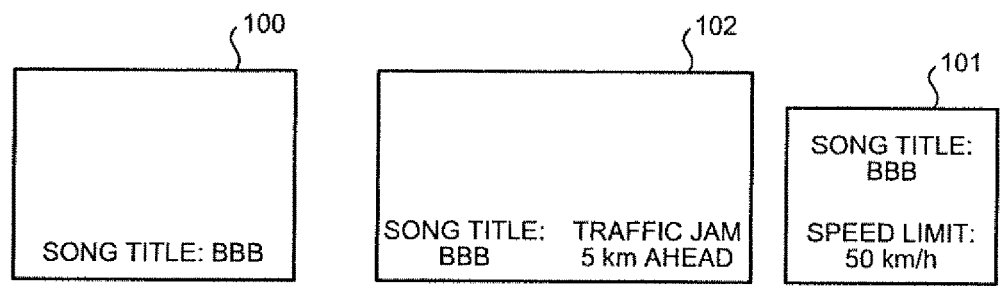
FIG. 5B is a diagram illustrating displaying examples (after change) of the displays.

In this case, as illustrated in FIG. 5B, the display processing apparatus 1 according to the modification changes, on the basis of the driver's operation, notification information of the center display 100 from "song title: AAA" into "song title: BBB". FIG. 5B is a diagram illustrating displaying examples (after change) of the displays 100 to 102.

The display processing apparatus 1 according to the modification changes, on the basis of the above-mentioned change in the notification information of the center display 100, notification information displayed on the head up display 101 (other display) into notification information that includes "speed limit: 50 km/h" and "song title: BBB", as illustrated in FIG. 5B. The display processing apparatus 1 according to the modification changes, on the basis of the above-mentioned change in the notification information of the center display 100, notification information displayed on the meter display 102 (other display) into notification information that includes "traffic jam 5 km ahead" and "song title: BBB", as illustrated in FIG. 5B.

Even when a type of notification information to be displayed is set for each of the displays 100 to 102, the display processing apparatus 1 according to the modification may display notification information, displayed on one display, on the other display. For example, when notification information that is not usually displayed on the meter display 102 is going to be displayed on the center display 100 by a driver's operation, the display processing apparatus 1 according to the modification may cause the meter display 102 to display notification information that includes notification information to be displayed on the center display 100 and notification information displayed on the meter display 102.

The display processing apparatus 1 according to the modification changes, in the other display, pieces of notification information so that a display position of presently-displayed notification information and a display position of notification information to be displayed on one display are not overlapped with each other. The notification information to be displayed on the other display, which is to be displayed on the one display, may be deleted after a predetermined displaying time interval has elapsed, for example.

Thus, the display processing apparatus 1 according to the modification is capable of informing a driver of many pieces of notification information. The display processing apparatus 1 according to the modification display pieces of notification information so that they are not overlapped with each other, so that it is possible to improve the visibility of the notification information. The display processing apparatus 1 according to the modification causes the other display to display new notification information of one display, which is changed on the basis of a driver's operation, so that it is possible to improve the visibility of the new notification information.

When changing notification information of one display on the basis of a driver's operation, the display processing apparatus 1 according to the modification sets notification information to be displayed on the other display on the basis of a priority of the notification information displayed on the one display and a priority of notification information displayed on the other display.

Specifically, when a priority of notification information displayed on one display is higher than a priority of notification information displayed on the other display, the display processing apparatus 1 according to the modification changes notification information displayed on the other display into the notification information displayed on the one display.

Figure 6A:
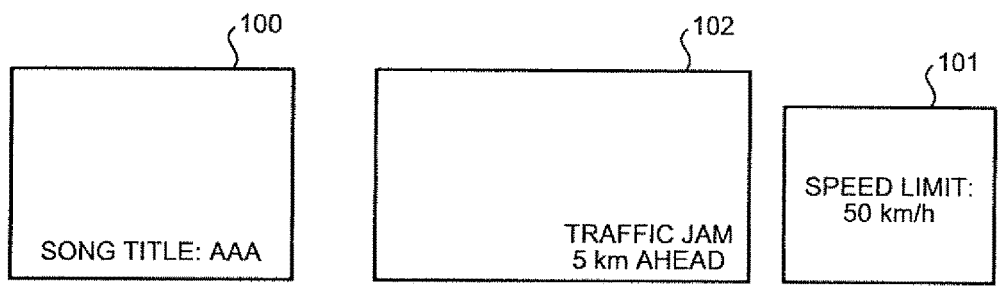
FIG. 6A is a diagram illustrating displaying examples (before change) of displays.

For example, as illustrated in FIG. 6A, "speed limit: 50 km/h" is displayed on the head up display 101 as notification information on road information. Furthermore, "traffic jam 5 km ahead" is displayed on the meter display 102 as notification information on traffic jam information. Furthermore, "song title: AAA" is displayed on the center display 100 as notification information on a title of a music song. FIG. 6A is a diagram illustrating displaying examples (before change) of the displays 100 to 102.

Figure 6B:
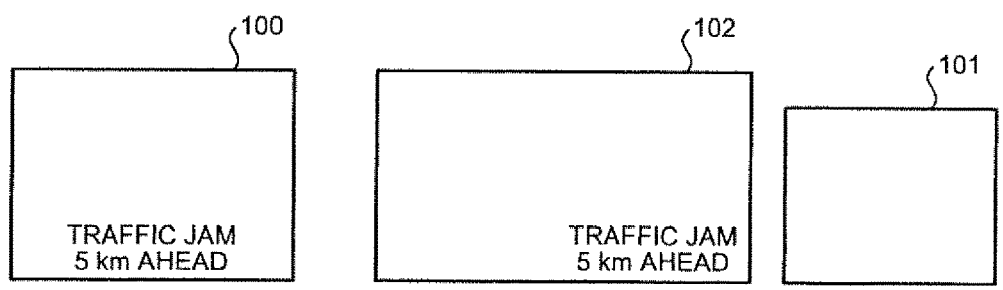
FIG. 6B is a diagram illustrating displaying examples (after change) of the displays.

In this state, when a driver performs an operation for deleting a display on the head up display 101, as illustrated in FIG. 6B, the display processing apparatus 1 according to the modification deletes "speed limit: 50 km/h" that is displayed on the head up display 101. FIG. 6B is a diagram illustrating displaying examples (after change) of the displays 100 to 102. When changing notification information displayed on the head up display 101 on the basis of a driver's operation, the next notification information is displayed on the basis of a priority of notification information to be displayed on the head up display 101.

A priority of road information displayed on the head up display 101 is "30", for example, and a priority of traffic jam information displayed on the meter display 102 is "50", for example. Thus, the priority of the notification information on road information is higher than the priority of the notification information on traffic jam information.

Thus, as illustrated in FIG. 6B, the display processing apparatus 1 according to the modification changes notification information of the meter display 102 from "traffic jam 5 km ahead" into "speed limit: 50 km/h".

Moreover, a priority of notification information on a title of a music song is "100", for example, and the priority of the notification information on traffic jam information is higher than the priority of the notification information on a title of a music song.

Thus, as illustrated in FIG. 6B, the display processing apparatus 1 according to the modification changes notification information of the center display 100 from "song title: AAA" into "traffic jam 5 km ahead". The display processing apparatus 1 according to the modification may change notification information of the meter display 102 and the center display 100 into "speed limit: 50 km/h".

Moreover, the display processing apparatus 1 according to the modification may exchange pieces of notification information to be displayed between the displays 100 to 102. For example, in the above-mentioned one example, the display processing apparatus 1 according to the modification may display, on the head up display 101, notification information on traffic jam information and/or a song title on the basis of a driver's operation.

When changing notification information displayed on one display on the basis of a driver's operation, and a priority of the notification information displayed on the one display is lower than a priority of notification information displayed on the other display, the display processing apparatus 1 according to the modification does not display, on the other display, the notification information displayed on the one display in some cases. A priority of notification information displayed on one display is higher than a priority of notification information displayed on the other display, the display processing apparatus 1 according to the modification may cause the other display to display notification information that includes the notification information displayed on the one display and the notification information displayed on the other display.

Thus, when different pieces of notification information are displayed on the displays 100 to 102 and notification information of one display is changed on the basis of a driver's operation, the display processing apparatus 1 according to the modification is capable of causing the other display to display notification information having a high priority. Thus, the display processing apparatus 1 according to the modification is capable of causing a driver to recognize notification information having a high priority.

The display processing apparatus 1 according to the modification may switch between (i) a mode in which notification information to be displayed on the other display is changed by a change in notification information to be displayed on one display, which is based on a driver's operation and (ii) a mode in which notification information to be displayed on the other display is not changed by a change in notification information to be displayed on one display, which is based on a driver's operation. In the mode in which notification information of the other display is not changed, for example, when new notification information is acquired, an adjustment is executed on the basis of the priority for each of the other displays so as to display notification information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display processing apparatus comprising:
   an acquisition unit that acquires notification information;
   a setting unit that sets, for each of a plurality of display screens, notification information to be displayed on a corresponding display screen based on a priority of the notification information; and
   a change unit that changes, when changing notification information of one of the plurality of display screens based on a user's operation on a display screen set by the setting unit, notification information to be displayed on another of the plurality of display screens based on a change in the notification information on the one display screen,
   wherein the change unit changes, based on the user's operation, notification information displayed on the one display screen, and when a priority of notification information displayed on the one display screen is higher than a priority of notification information displayed on the other display screen, the change unit changes notification information displayed on the other display screen into notification information that includes notification information displayed on the one display screen.

2. The display processing apparatus according to claim 1, wherein
   when changing, based on the user's operation, notification information displayed on one of the plurality of display screens, on which same notification information is displayed, into other notification information, the change unit changes the same notification information displayed on the other display screen into the other notification information.

3. The display processing apparatus according to claim 1, wherein
   when changing, based on the user's operation, notification information displayed on one of the plurality of display screens into other notification information, the change unit changes notification information displayed on the other display screen into notification information that includes notification information displayed on the other display screen and the other notification information.

4. The display processing apparatus according to claim 3, wherein
   the change unit changes notification information so that a display position of the notification information displayed on the other display screen and a display position of the other notification information are not overlapped with each other on the other display screen.

5. A display processing method comprising:
   acquiring notification information;
   setting, for each of a plurality of display screens, notification information to be displayed on a corresponding display screen based on a priority of the notification information; and
   changing, when notification information of one of the plurality of display screens is changed based on a user's operation on a display screen set in the setting, notification information to be displayed on another of the plurality of display screens based on a change in the notification information on the one display screen,
   wherein the changing includes changing, based on the user's operation, notification information displayed on the one display screen, and when a priority of notification information displayed on the one display screen is higher than a priority of notification information displayed on the other display screen, changing notification information displayed on the other display screen into notification information that includes notification information displayed on the one display screen.

* * * * *